(12) United States Patent
Murphey et al.

(10) Patent No.: US 8,384,613 B1
(45) Date of Patent: Feb. 26, 2013

(54) DEPLOYABLE STRUCTURES WITH QUADRILATERAL RETICULATIONS

(75) Inventors: Thomas W. Murphey, Albuquerque, NM (US); Joseph N. Footdale, Albuquerque, NM (US)

(73) Assignee: The United States of America as Represented by the Secretary of the Air Force, Washington, DC (US)

( * ) Notice: Subject to any disclaimer, the term of this patent is extended or adjusted under 35 U.S.C. 154(b) by 588 days.

(21) Appl. No.: 12/555,034

(22) Filed: Sep. 8, 2009

(51) Int. Cl.
*H01Q 1/08* (2006.01)
*H01Q 15/20* (2006.01)
(52) U.S. Cl. ........................ 343/880; 343/915
(58) Field of Classification Search ............ 343/840, 343/880, 881, 912, 915; 52/633, 653.1, 653.2, 52/655.1, 648.1, 641, 645, 646; 136/245; 244/158.9, 159.4, 159.5; 135/121, 124, 126, 135/128, 143, 144
See application file for complete search history.

(56) References Cited

U.S. PATENT DOCUMENTS

| | | | | |
|---|---|---|---|---|
| 4,482,900 | A * | 11/1984 | Bilek et al. | 343/915 |
| 5,125,206 | A * | 6/1992 | Motohashi et al. | 52/646 |
| 5,446,474 | A | 8/1995 | Wade | |
| 6,313,811 | B1 | 11/2001 | Harless | |
| 7,059,094 | B2 * | 6/2006 | Yamawaki | 52/646 |
| 7,211,722 | B1 | 5/2007 | Murphy | |

OTHER PUBLICATIONS

Hanaor, A. and Levy, R., "Evaluation of Deployable Structures for Space Enclosures," International Journal of Space Structures, vol. 16 No. 4, 2001, pp. 211-229.
Chen, Y. et al, "Square deployable frames for space applications. Part 1: theory," Proc. of the Inst. of Mechanical Eng., vol. 220, Part G; J. of Aerospace Eng., pp. 347-354.
Chen, Y. et al, "Square deployable frames for space applications. Part 2: realization," Proc. of the Institution of Mech. Eng., vol. 221, Part G: J. of Aero. Eng., pp. 37-54.
Botke, M., Murphy, et al. "Zero Deadband, Multiple Strut Synchronized Hinge for Deployable Structures," Proc. of the 36th Aerospace Mechanisms Symp. May 15-17, 2002.
Footdale, J. N. et al, "Deployable Structures with Quadrilateral Reticulations," AIAA, May 4-7, 2009.

* cited by examiner

*Primary Examiner* — Robert Karacsony
(74) *Attorney, Agent, or Firm* — James M. Skorich; Kenneth E. Callahan

(57) ABSTRACT

A non-planar surface support structure that is compatible with deployable thin shell reflector segments. The structure is composed of multiple four strut closed loops connected to compliant hinges at the nodes to create an effective surface. The deployed surface shape is determined by the strut lengths (L) and the node locations and the packaged compatibility constraint in which L1+L3−L2−L4 approximately equals zero. Each of the compliant hinges have degrees of freedom such that the compact configuration of the support structure is obtained by the translation of two opposite nodes of each loop upwards and the remaining two nodes downwards in a continuous process until all struts are approximately parallel and tightly bundled and the hinges lock out all degrees of freedom in the deployed configuration.

2 Claims, 12 Drawing Sheets

Three Quadrilateral Reticulations of a Surface

Deployment Process of a Surface with Grillage Reticulation

Three Quadrilateral Reticulations of a Surface

Deployment Process of a Surface with Grillage Reticulation

Deployment Process of a Surface with Radial Grillage Reticulation

A

B

C

D

E

F

Deployment Process of a surface with Lamella Reticulation

A

B

C

D

E

F

Two-dimensional deployment of a cross section of the structure that includes
a linearly connected set of structural elements and nodes

A

B

C

D

E

Compatibility constraint for a single loop

A

B

C

D

Deployment for a 16 Bay Center-fed Reflector

Deployment for a 20 Bay Corner-fed Reflector

Offset Edge-fed System with Differing Number of Bays in Each Direction

Deployment of a Center-fed Reflector with Increased Bay Count

Intersection of struts is non-orthogonal when all struts are of equal length

Node locations are repositioned such that strut intersection is orthogonal and satisfying loop compatibility constraint.

DEPLOYABLE STRUCTURES WITH QUADRILATERAL RETICULATIONS

STATEMENT OF GOVERNMENT INTEREST

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF THE INVENTION

The present invention relates generally to compactly stowable and deployable structures and more particularly to those that are compatible with deployable thin-shell reflector segments. In the deployed configuration, the invention is well suited to collect or focus transmitted and received electromagnetic energy. The invention could be used in communication, radar, electromagnetic energy concentration and solar array systems. Reflector gain characterizes the deployed configuration in energy concentration applications and increases with increasing aperture area. The furled (packaged) configuration is engineered to minimize packaged volume and envelope dimensions. The invention has utility in both terrestrial and space applications.

An extensive body of prior art exists for both deployable reflectors and solar arrays. Reflector concepts are generally characterized as mesh, deformable solid surface, segmented solid surface, or a combination of these approaches. Mesh reflectors tension an open knit resilient fabric into a faceted shape that approximates the desired surface and reacts the tension with a compression structure. A precision surface requires a large number of shaping cords to pull the mesh into the desired configuration. Adjusting the surface is a labor intensive iterative process involving characterization of the surface sensitivity to shaping cord characteristics, measuring the surface shape, analysis to predict cord adjustments and performing the adjustments (see for example, U.S. Pat. No. 6,313,811). The wrap-rib mesh reflector averts some of this process by relying on precisely shaped radial ribs (e.g., U.S. Pat. No. 5,446,474) however; the resulting surface is still limited to lower frequency use due to faceting between ribs.

Solid surface deployable reflectors avoid the frequency limitation of mesh reflectors and concepts typically employ either deformable reflector surfaces or segmented rigid reflector surfaces. Deformable surface approaches include inflatable reflectors, spring-back reflectors and concertina folded reflectors. Inflatable reflectors use gas pressure to form the shape of a membrane surface. This class of reflector suffers from poor dimensional stability due to large temperature variations and high material coefficients of thermal expansion. Spring-back reflectors deform the reflector surface into a cylindrical shape compatible with launch vehicles; however, the longest packaged dimension is limited to the diameter of the reflector. Concertina folded reflectors have been proposed. Segmented reflectors split the surface into a finite number of rigid panels that are folded inward to reduce the diameter of the structure. While each panel is dimensionally stable, relative alignment of the petals is challenging and the resulting mechanisms are heavy and do not package well.

The current invention is a hybrid deformable-segmented surface support structure that is compatible with deployable thin shell reflector segments. The invention is also compatible with mesh RF reflective surfaces, tensioned solar array blankets and rolled thin film photovoltaic arrays. The invention offers better packaging and lower fabrication costs than prior art.

SUMMARY OF THE INVENTION

The present invention encompasses a non-planar deployable segmented surface support structure with particular applications for space communications and radar applications. The invention does not improve upon the actual reflective surface used in these applications; rather, it is for the support structure to which a reflective surface would be attached. The support structure forms an effective surface by combining four-sided (quadrilateral) structural loops in a non-planar arrangement. Three quadrilateral reticulations are covered by the invention (grillage, radial, and lamellar). In each case, the deployed quadrilateral loops are packaged into a compact configuration by translation of two opposite nodes (nodes on the same diagonal within a quadrilateral) upwards and the remaining two nodes downwards. In a continuous process, the struts that comprise the loops rotate until they are all parallel and tightly bundled. Unique nodes are used that allow for relative motion of the struts during deployment, but lock and form a strong and stiff connection between the struts in the deployed configuration. In planar or near planar configurations, the reflective surface could be replaced by photovoltaic cells to create a solar array.

DESCRIPTION OF THE PREFERRED EMBODIMENT

The current invention is a hybrid deformable, segmented surface support structure that is compatible with deployable thin shell reflector segments, meshed radio frequency (RF) reflective surfaces, tensioned solar array blankets, and rolled thin film photovoltaic arrays. It employs deployable structures with quadrilateral reticulations.

Figure 1:
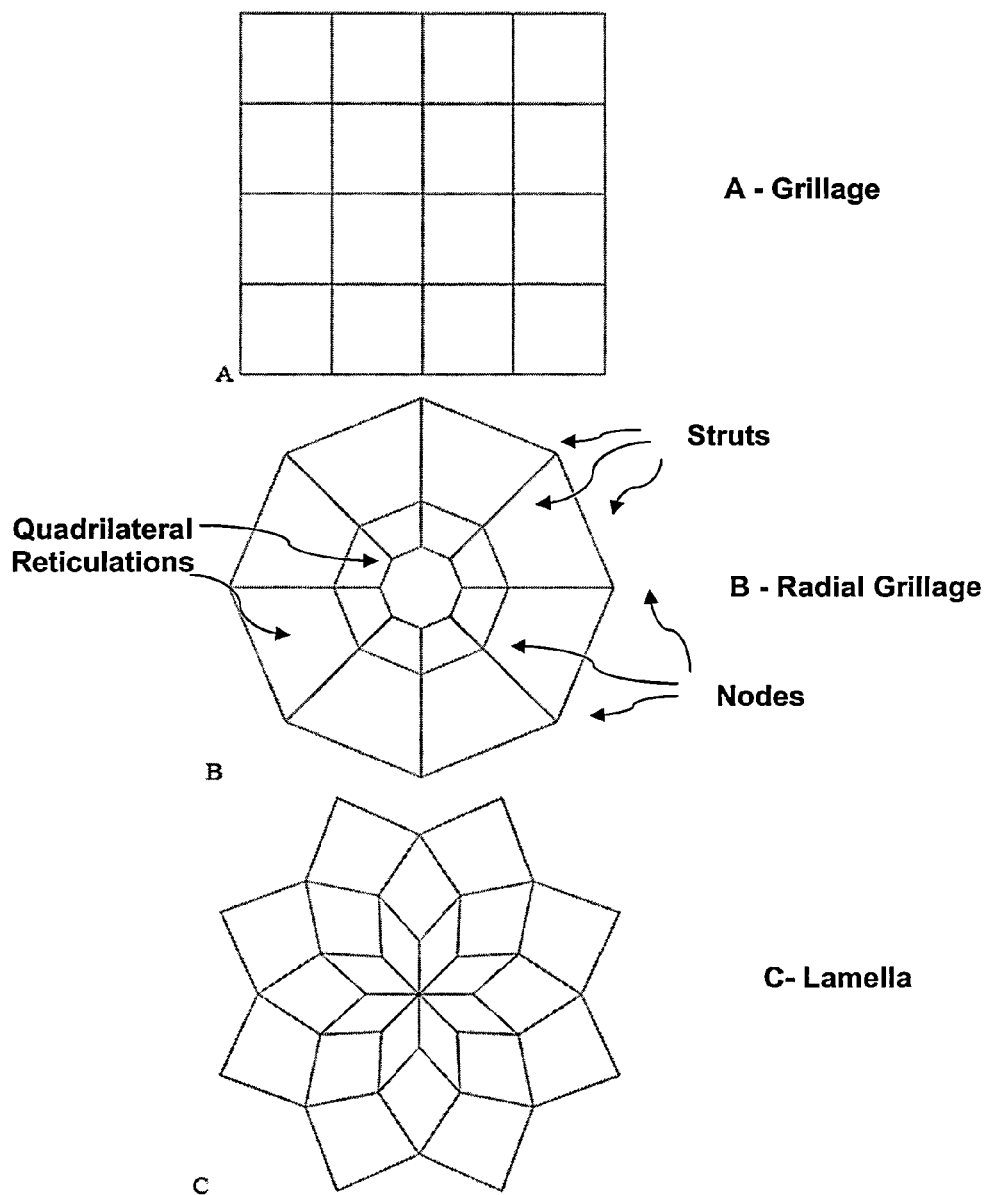
FIG. 1 shows the three quadrilateral reticulations of a surface: grillage (A), radial grillage (B) and lamella (C).

The structure is composed of multiple four member closed loops assembled to create an effective surface. Three quadrilateral reticulations are possible and are shown in FIG. 1: grillage, radial grillage and lamellar. These reticulations are common in civil engineering applications and various methods have been devised to render them deployable. However, nearly all prior work has been associated with pantographic (scissor) based deployable structures. A comprehensive review of the prior art associated pantographic deployable structures is found in Hanaor (Hanaor, A. and Levy, R., "Evaluation of Deployable Structures for Space Enclosures," International Journal of Space Structures, Vol. 16 No. 4, 2001, pp. 211-229).

A considerable body of prior art also exists using Bennett linkages to render reticulations deployable (Chen, Y. and You, Z., "Square deployable frames for space applications. Part 1: theory," Proceedings of the Institution of Mechanical Engineers, Vol. 220, Part G: Journal of Aerospace Engineering, pp. 347-354 and Chen, Y. and You, Z., "Square deployable frames for space applications. Part 2: realization," Proceedings of the Institution of Mechanical Engineers, Vol. 221, Part G: Journal of Aerospace Engineering, pp. 37-45.) The relative motions (kinematics) of elements in a Bennett linkage are fundamentally different from the structures described within. In a Bennett linkage, each joint is based on a single revolute (hinge) joint and as a result, the elements rotate as the structure articulates (this rotation is about the long axis of the element). The deployment kinematics described within are based on compliant hinges that behave similar to multi-axis hinge tables such that there is no rotation about the axis of each element. This class of articulation has been applied to planar two-dimensional grillage structures (e.g., U.S. Pat. No. 7,211,722 and Botke, M., Murphy, D., Murphey, T., Sorensen, P. "Zero Deadband, Multiple Strut Synchronized Hinge for Deployable Structures," Proceedings of the 36$^{th}$ Aerospace Mechanisms Symposium, Glenn Research Center, May 15-17, 2002). In these examples, one fourth of the struts are missing to allow the deployment of a blanket between parallel struts. In U.S. Pat. No. 3,757,476, all elements are present. The current invention varies from this prior art in the ability to form non-planar surface structures in the deployed state.

In the stowed state, the struts are packaged in a parallel fashion as shown in FIG. 2A. This packaging is independent of the curvature of the effective surface formed by the structure in the deployed state.

Figure 2:
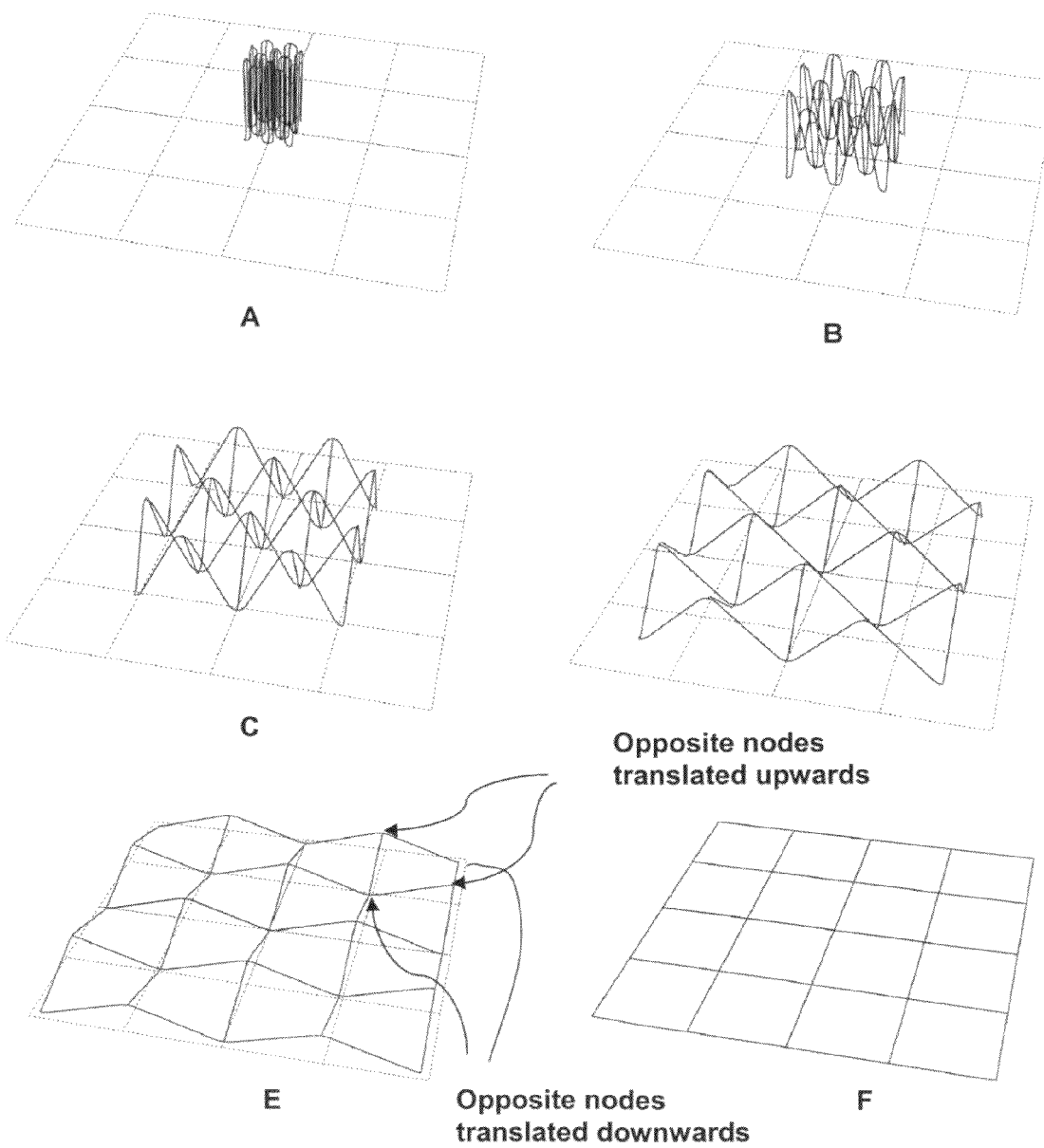
FIG. 2 shows snap-shots in the deployment process of a surface with grillage reticulation proceeding from a packaged configuration to full deployment in steps A through F.
Figure 3:
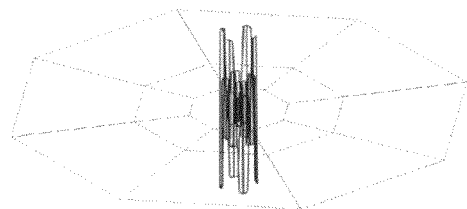
FIG. 3 shows snap-shots in the deployment process of a surface with radial grillage reticulation proceeding from a packaged configuration to full deployment in steps A through F.
Figure 3:
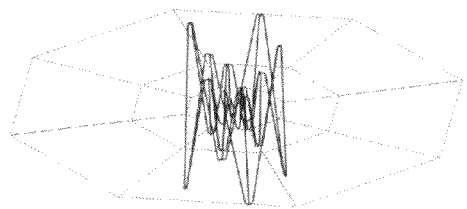
Figure 3:
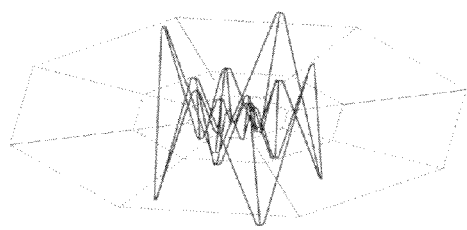
Figure 3:
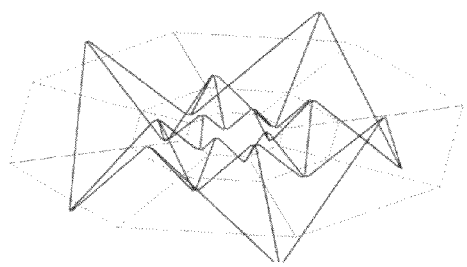
Figure 3:
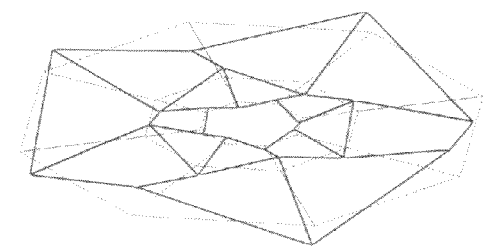
Figure 3:
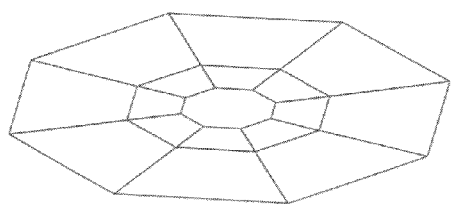
Figure 4:
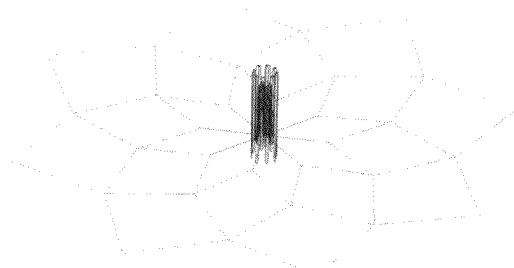
FIG. 4 shows snap-shots in the deployment process of a surface with lamella reticulation proceeding from a packaged configuration to full deployment in steps A through F.
Figure 4:
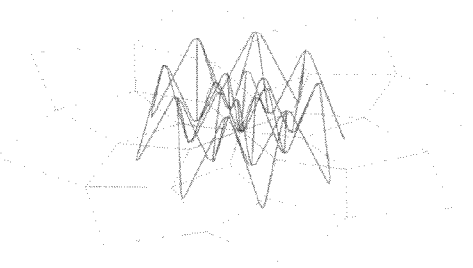
Figure 4:
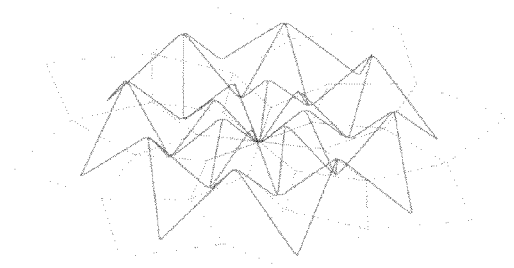
Figure 4:
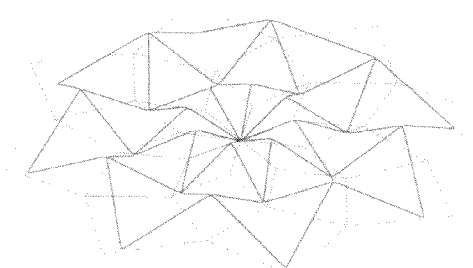
Figure 4:
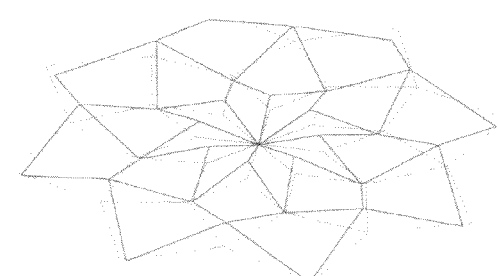
Figure 4:
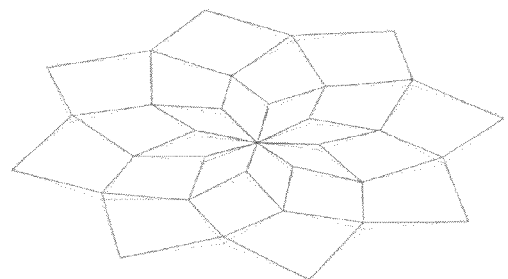
Figure 5:
FIG. 5 shows the two-dimensional deployment of a cross section of the structure that includes a linearly connected set of structural elements and nodes proceeding in steps A through E.
Figure 5:
Figure 5:
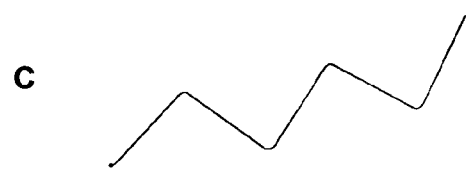
Figure 5:
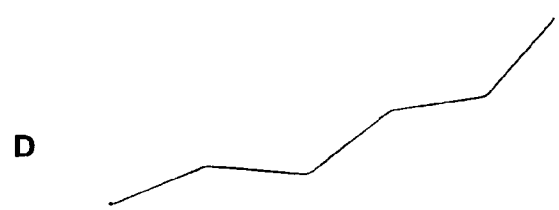
Figure 5:
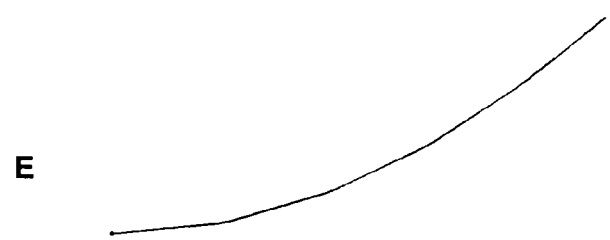

The invention employs the three quadrilateral reticulations of structural elements shown in FIG. 1. The support structure is formed by a repeating arrangement of structural elements or struts joined by compliant hinges at the nodes. Each reticulation is composed of loops with four sides and can be transformed from a large surface area configuration to a compact bundle of parallel struts (e.g., FIG. 2F to FIG. 2A). The reverse of this transformation, i.e. deployment, is shown in FIG. 2 to FIG. 4 for each reticulation. In each case, the quadrilateral loops are transformed by translation of two opposite nodes upwards and the remaining two nodes downwards (see FIG. 2E). In a continuous process, the struts rotate until they are all parallel and tightly bundled. FIG. 5 illustrates this process for a cross section of a grillage reticulation.

The deployed structure forms an effective surface. Several surface shapes have utility. Planar surfaces can be used to manipulate incident electromagnetic energy, to support photovoltaic arrays or to serve as spacecraft decelerators. Cylindrical surfaces and surfaces with a parabolic cross section can be used as trough concentrators. Spherical surfaces and paraboloids of revolution focus energy towards a point. In all cases, the effective surface formed can be offset such that the geometric center of the surface profile does not correspond with the geometric center of the structure.

Figure 6:
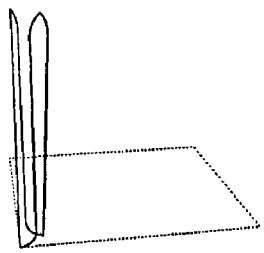
FIG. 6 illustrates the compatibility constraint for a single loop deployed in steps A through D.
Figure 6:
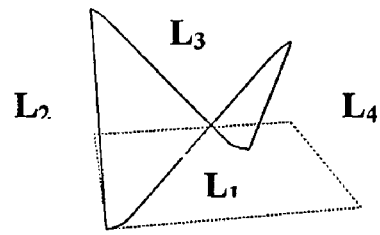
Figure 6:
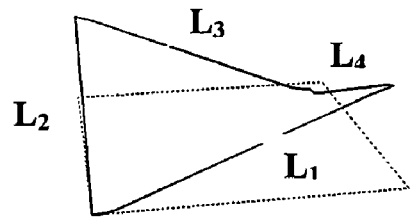
Figure 6:
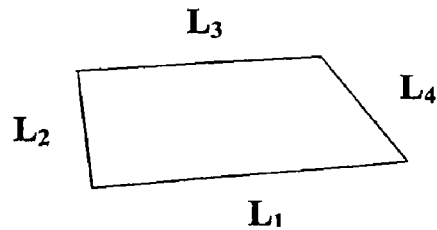

For each reticulation architecture and surface shape, there are restrictions on element lengths and node locations. In general, configurations that satisfy or nearly satisfy the packaged compatibility constraint are feasible. This constraint requires that every loop closes in the packaged configuration; the vertical distance traversed by every loop in the packaged configuration must sum to zero. FIG. 6 illustrates this constraint where, $$L_1 - L_2 + L_3 - L_4 = 0. \tag{1}$$

The strut lengths are successively labeled $L_1$, $L_2$, $L_3$, and $L_4$ and are connected at the nodes. Subject to this constraint, there is considerable freedom in the layout of nodes for each reticulation pattern.

The struts provide bending and torsional stiffness and functionally act as rigid structural elements during and after deployment. The nodes connecting the struts act as compliant multiple degree of freedom hinges to allow the structure to fold, but lock out all degrees of freedom once in the deployed configuration. In general, these hinges may be of any design but must be able to be of the shape of the intersecting struts (orthogonal or non-orthogonal), go through the deployment motions without binding, and lock in the deployed configuration. Compliant hinges may be used because deployment may deform the nodes in ways that hinges or combinations of hinges in multi-element mechanisms do not accommodate. Thus, compliant hinges allow articulation of the structure without binding. Planar surfaces are a special case that can be articulated without binding using hinge tables. However, the generation of curved surfaces generally destroys such ideal kinematics and requires compliant hinges to prevent binding.

Grillage Reticulation Node Arrangement.

Figure 7:
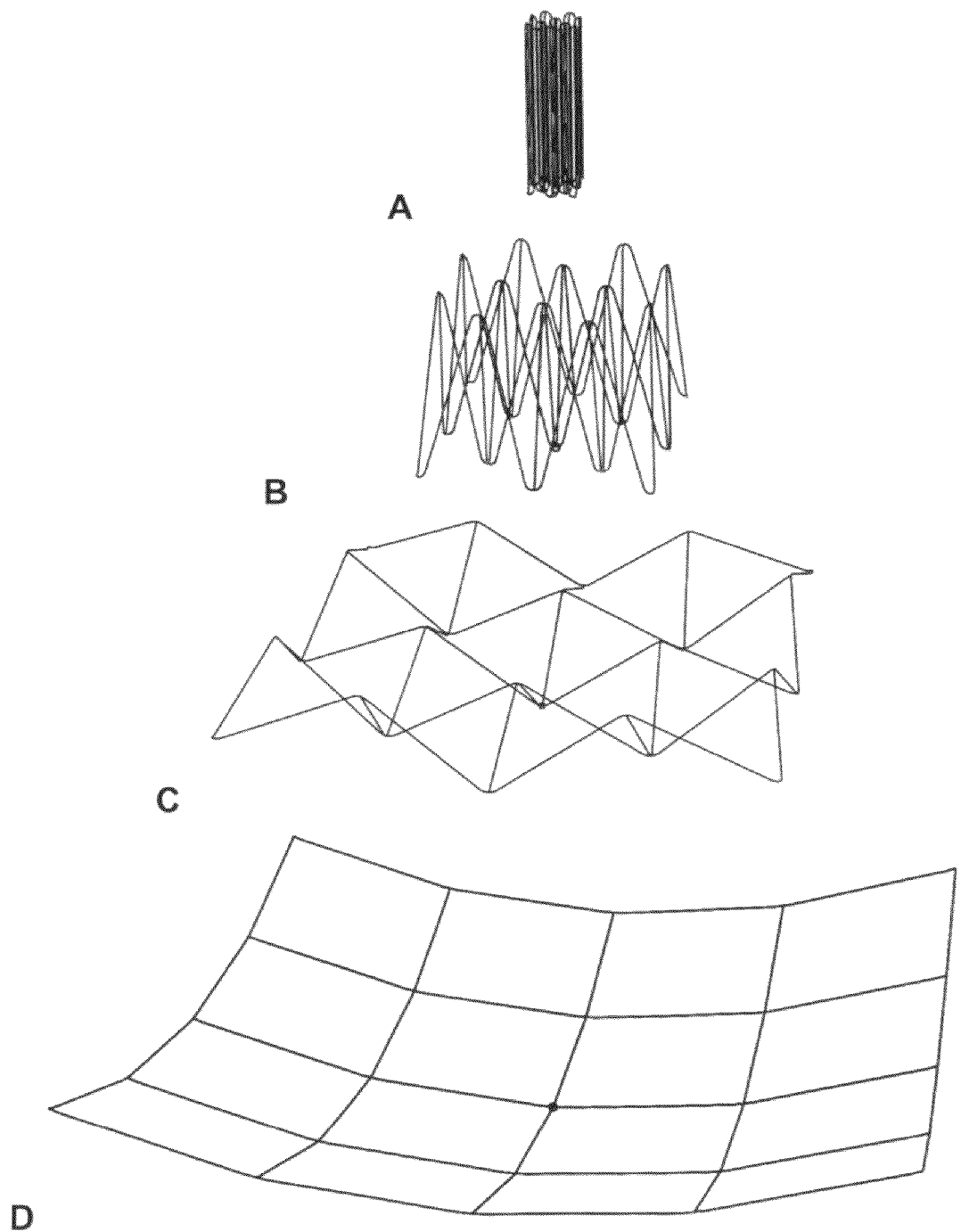
FIG. 7 shows the quadrilateral reticulation of structural elements and deployment for a 16 bay center-fed reflector in steps A through D.
Figure 8:
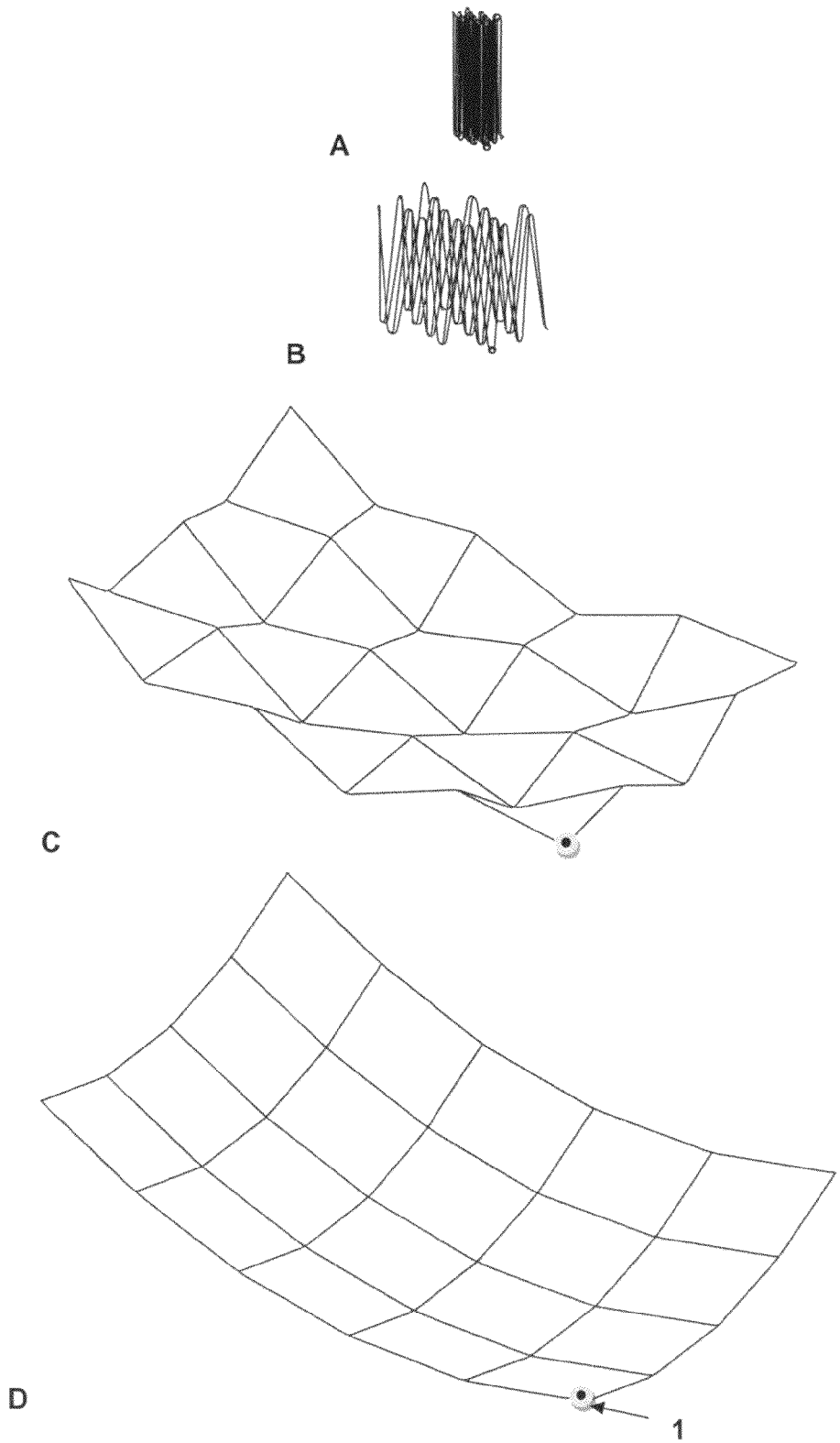
FIG. 8 shows an offset corner fed system and associated deployment sequence in steps A through D.
Figure 9:
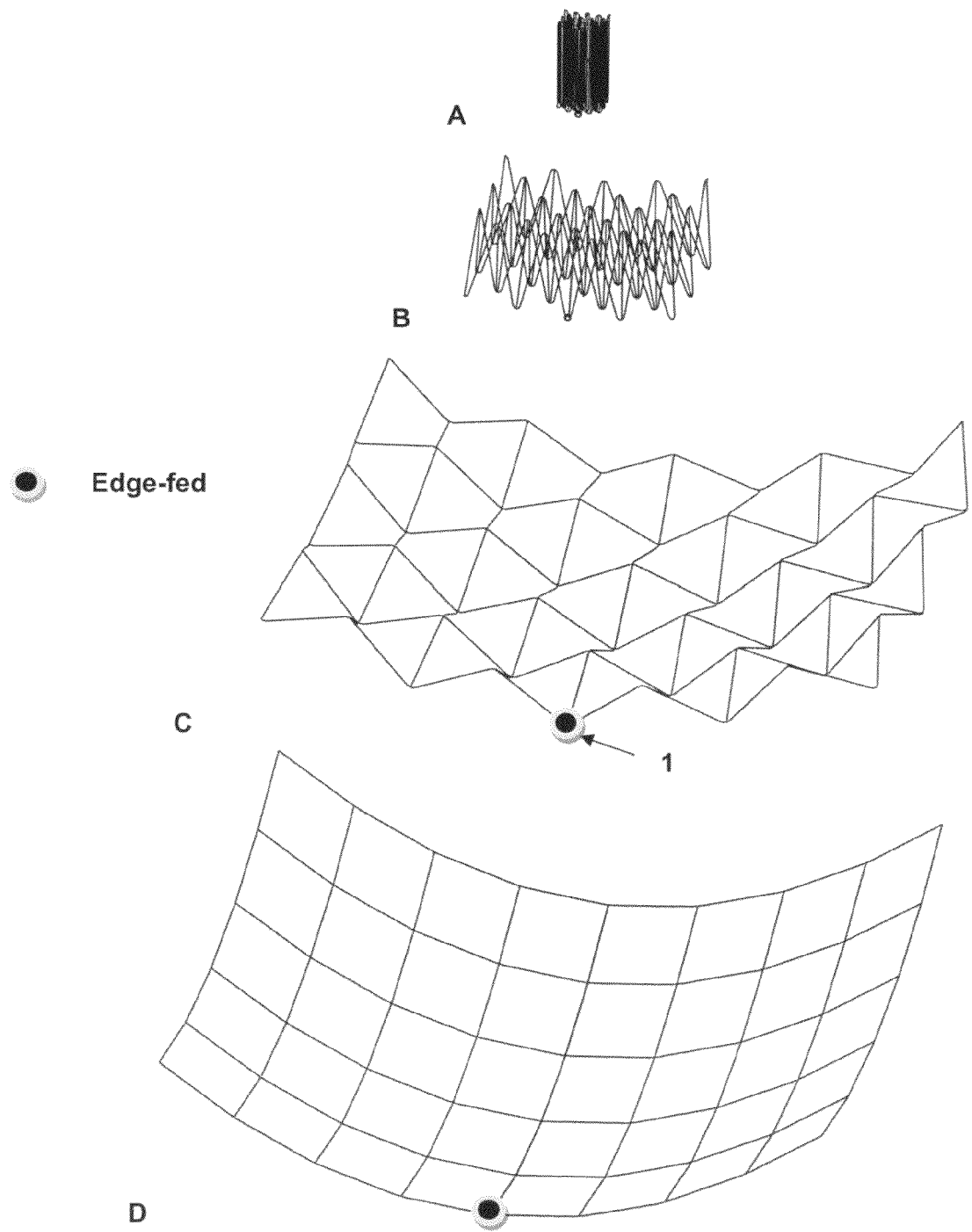
FIG. 9 shows an offset edge fed system with differing number of bays in each direction deployed in steps A through D.

Several grillage configurations are shown in FIGS. 7 through 10. FIG. 7 shows a paraboloid of revolution with the surface geometric center being coincident with the structure geometric center. FIG. 8 shows an alternate configuration with the surface geometric center offset to the corner of the structure. FIG. 9 shows an alternate configuration with the surface geometric center offset to the edge of the structure. Additional configurations such as those where the geometric center of the formed surface does not lie on the structure itself are also feasible. The positioning of the geometric surface center relative to the structure is arbitrary. The structure is not required to be symmetric about the center of curvature of the effective formed surface.

Figure 10:
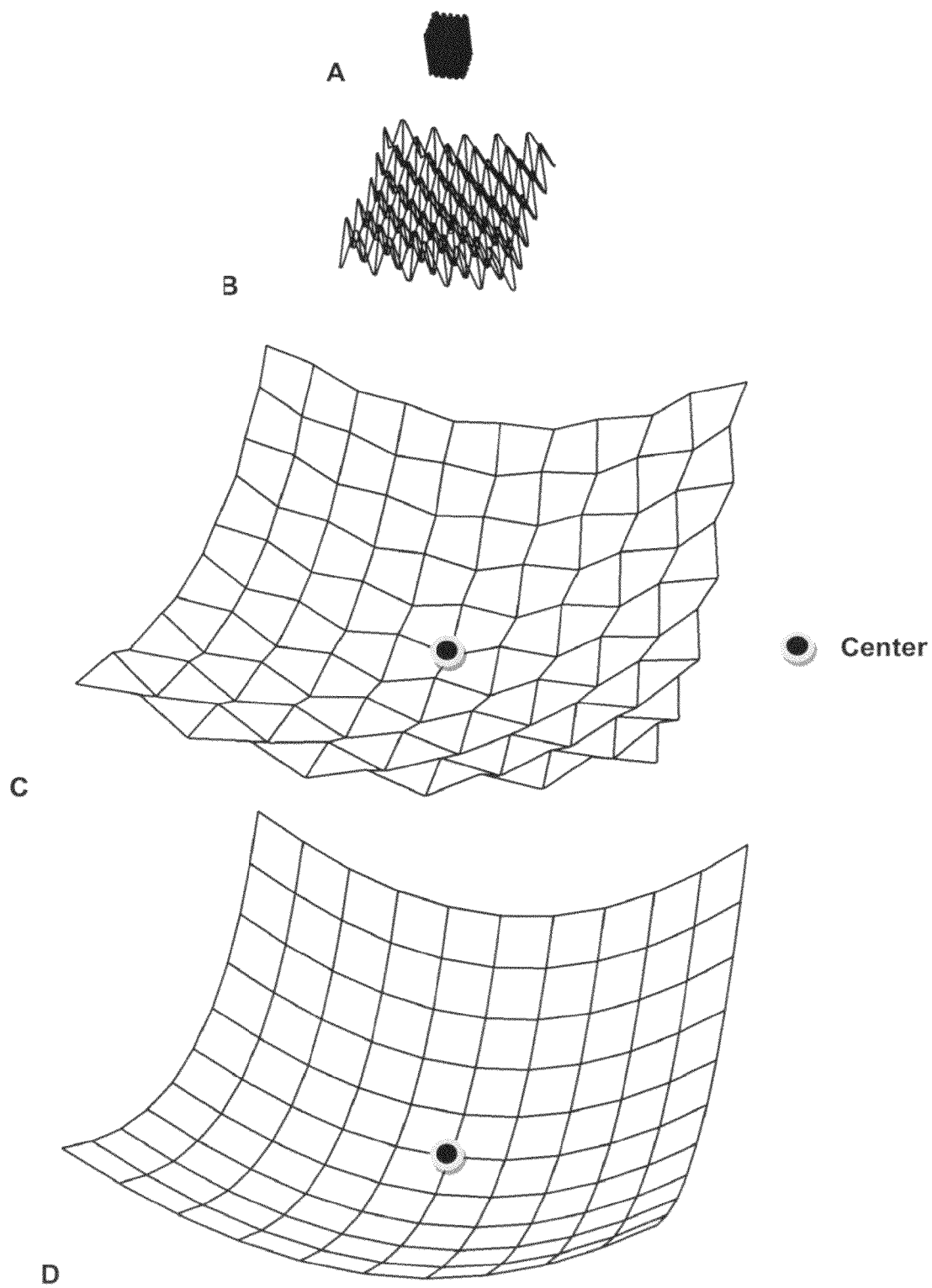
FIG. 10 shows a center fed reflector with increased bay count (100 bays) deployed in steps A through D.

FIG. 10 illustrates scaling of the number of bays in the system. This is also arbitrary and can be as small as one bay and has no upper limit. The structure can also have an arbitrary shape, such as the rectangular shape of FIG. 10 that has an eight by five arrangement of bays.

Figure 11:
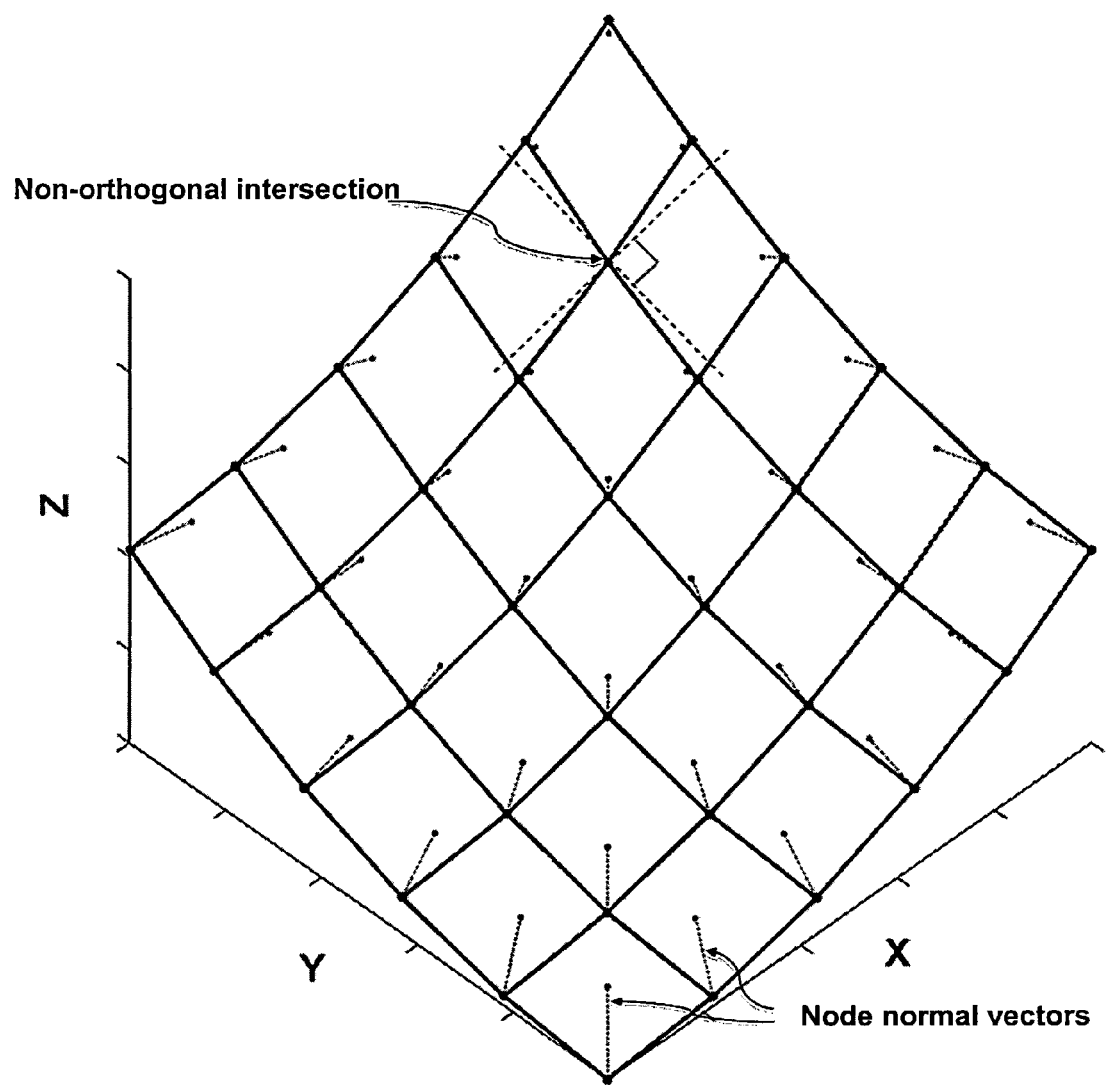
FIG. 11 illustrates the intersection of strut members that is non-orthogonal when the structure is constructed of equal length struts.

The node locations of configurations illustrated in FIG. 7 through FIG. 10 are arranged in an equivalent fashion. In this case the nodes of all the above configurations are constrained to be coincident with an effective paraboloid surface formed when the structure is fully deployed and all struts are of equal length. Equal length struts guarantee that the loop compatibility constraint of EQ. 1 is satisfied. A characteristic of this configuration is that the intersection of struts at each node location is non-orthogonal with respect to the plane tangent to the effective surface at said node location. This characteristic is illustrated in FIG. 11. The angle at which the struts intersect varies depending on the node location. It is conceivable to design unique joints to accommodate the kinematic path required for the structure to package as described in FIG. 2A. However, it is preferred for the struts to intersect at all node locations in an orthogonal manner. This minimizes the angle the compliant hinge must accommodate when the structure is fully packaged and allows the use of identical joints throughout the structure.

Figure 12:
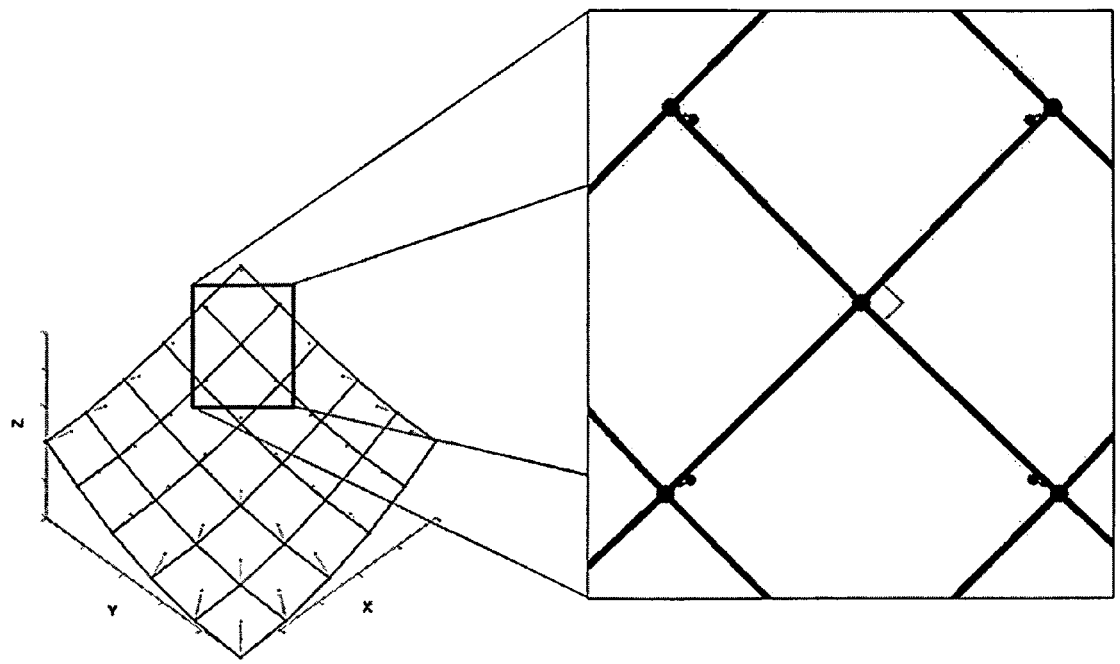
FIG. 12 shows node locations can be positioned on the effective surface such that the intersection of struts is orthogonal while satisfying the loop compatibility constraint.

The node locations may be arbitrarily placed on the effective surface to be formed as long as the loop compatibility constraint is satisfied. FIG. 12 illustrates the preferred configuration where the intersection of struts at the node locations is orthogonal.

Radial Grillage Reticulation Node Arrangement.

Only a specific ratio of ring radii satisfy the packaged compatibility condition for a flat surface, $$\frac{r_{i+1}}{r_i} = \frac{1 + \sin\frac{\pi}{n}}{1 - \sin\frac{\pi}{n}}$$

where n is the number of radial ribs, $r_i$ is the radius of loop i and $r_{i+1}$ is the radius of the next larger loop. n=8 in FIG. 3 so that $$\frac{r_{i+1}}{r_i} = 2.24$$

Similar, but more complex arrangements can be derived for non-planar surfaces. Again, compliant nodes are used to accommodate deployment of arrangements that would otherwise bind.

Lamella Reticulation Node Arrangement.

Centered symmetric lamella surfaces inherently satisfy the compatibility condition as long as all members within a ring are the same length. Offset non-planar configurations conceivably would have rings with varying member lengths that would not automatically satisfy the condition.

The invention claimed is:
1. A deployable and collapsible structure comprising:
a strut being straight, rigid and having a fixed length;
a quadrilateral loop comprised of four of the struts being connected end-to-end at nodes, with the respective lengths being $L_1$, $L_2$, $L_3$ and $L_4$, and satisfying a constraint equation defined as

$L_1 - L_2 + L_3 - L_4 = 0$;

each of the nodes providing the connected struts with multiple degrees of rotational freedom;
a plurality of the quadrilateral loops, including adjacent quadrilateral loops having in common one of the struts;
the struts being approximately parallel when the quadrilateral loops are collapsed, whereby
the structure is collapsed;
the nodes having, loci forming a plurality, i, of concentric, circles when the structure is deployed;
each of the circles having a radius, r, whereby
the deployed structure forms a radial grillage;
the radial grillage having a geometric center;
a plurality, n, of the struts lying radially with respect to the center;
a cross section of the radial grillage being planar when $$\frac{r_{i+1}}{r_i} = \frac{1 + \sin\frac{\pi}{n}}{1 - \sin\frac{\pi}{n}}$$

wherein: $r_i$ the radius of circle i; and
$r_{i+1}$ = the radius of the next larger circle;
a diagonal being a straight line that intersects two of the nodes and also forms an respectively, with each of the four struts comprising one of the quadrilateral loops when the structure is deployed;
a pair of opposing nodes being comprised of the two nodes that intersect each one of the diagonals; and
the loop being collapsed by translating each of the two pairs of opposing nodes in opposite directions.

2. The structure defined by claim 1, wherein the deployed structure approximates a paraboloid.

* * * * *